(12) United States Patent
Rodriguez et al.

(10) Patent No.: US 8,434,589 B1
(45) Date of Patent: May 7, 2013

(54) OBSTRUCTION DEVICE FOR REDUCING NOISE EMITTED FROM A BLOWER

(75) Inventors: Jorge M. Rodriguez, Webster, NY (US); Glenn David Batchelor, Faiport, NY (US); Ali R. Drgham, Fairport, NY (US); Francisco Zirilli, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/295,860

(22) Filed: Nov. 14, 2011

(51) Int. Cl.
| F01N 1/08 | (2006.01) |
| F01N 13/00 | (2010.01) |
| H05K 5/00 | (2006.01) |
| H05K 7/20 | (2006.01) |
| F01D 5/00 | (2006.01) |

(52) U.S. Cl.
USPC .......... 181/225; 181/230; 181/274; 361/695; 415/119; 454/184

(58) Field of Classification Search ............... 181/225, 181/230, 274; 454/184; 415/119; 361/695
See application file for complete search history.

(56) References Cited

U.S. PATENT DOCUMENTS

| 2,086,812 | A | * | 7/1937 | Luty | 431/192 |
| 2,112,608 | A | * | 3/1938 | Schmidt | 415/119 |
| 2,159,913 | A | * | 5/1939 | Tenney | 165/75 |
| 2,328,236 | A | * | 8/1943 | Stoner | 96/382 |
| 2,653,798 | A | * | 9/1953 | Baldinus | 165/41 |
| 2,688,371 | A | | 9/1954 | Del Pesaro | |
| 2,731,194 | A | * | 1/1956 | Kent | 417/312 |
| 2,790,490 | A | * | 4/1957 | Smith | 239/406 |
| RE24,421 | E | * | 1/1958 | Patrick | 236/10 |
| 4,232,653 | A | * | 11/1980 | Otterpohl | 126/77 |
| 4,495,858 | A | * | 1/1985 | Erickson | 454/261 |
| 4,655,694 | A | * | 4/1987 | Berfield | 417/423.2 |
| 5,153,618 | A | * | 10/1992 | Frank et al. | 347/125 |
| 5,460,571 | A | * | 10/1995 | Kato et al. | 454/184 |
| 5,536,140 | A | * | 7/1996 | Wagner et al. | 415/119 |
| 5,707,282 | A | * | 1/1998 | Clements et al. | 454/184 |
| 5,822,186 | A | * | 10/1998 | Bull et al. | 361/695 |
| 5,855,469 | A | * | 1/1999 | McConnell | 415/171.1 |
| 6,039,532 | A | * | 3/2000 | McConnell | 415/119 |
| 6,129,176 | A | * | 10/2000 | Hunsberger et al. | 181/202 |
| 6,280,317 | B1 | * | 8/2001 | Przilas et al. | 454/184 |
| 6,402,612 | B2 | * | 6/2002 | Akhtar et al. | 454/186 |
| 6,565,171 | B2 | | 5/2003 | Miquel et al. | |
| 6,666,660 | B2 | * | 12/2003 | Kegg et al. | 417/368 |
| 6,866,473 | B2 | * | 3/2005 | Otsuka | 415/119 |
| 6,974,376 | B2 | * | 12/2005 | Yamaguchi et al. | 454/146 |
| 7,210,903 | B2 | * | 5/2007 | Lyons | 415/204 |
| 7,266,860 | B2 | | 9/2007 | Tate et al. | |
| 7,354,244 | B2 | * | 4/2008 | Hasbargen et al. | 415/212.1 |
| 7,443,670 | B2 | * | 10/2008 | Nishi et al. | 361/695 |
| 7,515,411 | B2 | * | 4/2009 | Woolsey et al. | 361/695 |
| 7,556,031 | B2 | * | 7/2009 | Russell | 123/590 |
| 7,735,603 | B2 | * | 6/2010 | Roberts | 181/230 |

(Continued)

*Primary Examiner* — David Warren
*Assistant Examiner* — Christina Russell
(74) *Attorney, Agent, or Firm* — Luis M. Ortiz; Kermit D. Lopez; Kevin Soules

(57) ABSTRACT

A method and system for reducing or eliminating banding in a rendering device caused by pressure pulsations from a blower. The pressure pulsation frequency resulting from a plurality of pressure pulsations propagated from a blower can be reduced by forming an obstruction device at an outlet of the blower. Total airflow and total pressure propagated by the blower are maintained by modifying or removing an existing restrictor plate thereby reducing acoustic noise associated with the pressure pulsations in a xerographic cavity.

11 Claims, 3 Drawing Sheets

U.S. PATENT DOCUMENTS

| | | | |
|---|---|---|---|
| 7,780,408 B2* | 8/2010 | Lazzarato et al. | 415/211.2 |
| 7,957,657 B2* | 6/2011 | Zirilli et al. | 399/49 |
| 8,151,931 B2* | 4/2012 | Eaton et al. | 181/224 |
| 8,231,331 B2* | 7/2012 | Wu | 415/119 |
| 2005/0113015 A1* | 5/2005 | Crippen et al. | 454/184 |
| 2006/0102185 A1* | 5/2006 | Drew et al. | 128/207.13 |
| 2008/0053749 A1* | 3/2008 | Utsunomiya | 181/286 |
| 2009/0294211 A1* | 12/2009 | Roberts | 181/230 |
| 2010/0155174 A1* | 6/2010 | Roberts et al. | 181/230 |
| 2011/0232992 A1* | 9/2011 | Utsunomiya | 181/225 |
| 2012/0090596 A1* | 4/2012 | Miles et al. | 126/502 |

* cited by examiner

OBSTRUCTION DEVICE FOR REDUCING NOISE EMITTED FROM A BLOWER

TECHNICAL FIELD

Embodiments are generally related to the field of computer and printer application. Embodiments are also related to methods and systems for reducing acoustic noise from blowers.

BACKGROUND OF THE INVENTION

Printing devices and other electronic equipment can suffer from errors associated with acoustic vibrations caused by blowing devices. For example, some printing machines (e.g., Xerox IGen4) have experienced banding problems at specific frequencies caused by structural vibration associated with acoustic noise from a blower. The blower is provided for cooling and thereby controlling temperature and humidity within the apparatus. Pressure pulsations associated with the spinning blades of the blower impart the unwanted vibrations. Thus, a need exists for a way to prevent structural vibrations associated with the acoustic noise from the blower.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for reducing acoustic noise vibration.

It is another aspect of the disclosed embodiments to provide for an enhanced method, system, and apparatus for reducing acoustic noise vibrations in electronic equipment.

It is yet another aspect of the disclosed embodiments to provide an enhanced method, system, and apparatus for reducing acoustic noise vibrations associated with blowers in electronic equipment such as rendering devices. The aforementioned aspects and other objectives and advantages can now be achieved as described herein.

A method, apparatus, and system are disclosed herein for reducing acoustic noise comprising reducing a plurality of pressure pulsations propagated by the blower. An obstruction device can be inserted at an outlet of the blower. An impedance at an inlet of the blower can be utilized to maintain the total airflow and the total pressure propagated by the blower, thereby reducing the acoustic noise associated with the pressure pulsations propagated by the blower.

The obstruction device can be configured as a rigid beam fixedly connected to two edges of the outlet of the blower with one or more flat wings perpendicular to the rigid beam. The total airflow and the total pressure propagated by the blower without the obstruction device can be measured to identify a pressure pulsation frequency resulting from the pressure pulsations propagated from the blower. Then the obstruction device can be formed at the blower outlet to eliminate the pressure pulsations at the predetermined pressure pulsation frequency. In some embodiments, the size of the impedance at the inlet of the blower can be adjusted to maintain total airflow and total pressure after the obstruction device is inserted at the blower outlet.

The blower can be, for example, an evaporative blower for cooling and dehumidifying a xerographic cavity associated with a rendering device. In this case, forming the obstruction device further comprises identifying a banding frequency in a printed result from the rendering device associated with the pressure pulsation frequency before the obstruction device is inserted, and shaping the obstruction device to eliminate the banding frequency in the printed result associated with the pressure pulsations.

In some embodiments, an operation can be implemented for comparing the banding frequency with the pressure pulsation frequency in order to ensure that the acoustic noise is actually the result of the pressure pulsations.

In other embodiments, the obstruction device may include an impingement angle between the obstruction device and the blower outlet that is adjusted to further reduce acoustic noise. The rigid beam of the obstruction device is connected to the blower outlet with screws, rivets, glue, and/or a weld.

In still another embodiment, an apparatus for reducing acoustic noise can be implemented. Such an apparatus can include the aforementioned blower, which creates an airflow causing pressure pulsations. Such an apparatus can also include a restrictor plate connected to an inlet of the blower, wherein the restrictor plate creates an airflow impedance at the inlet of the blower. An obstruction device can also be included, which comprises a rigid beam fixedly connected to two edges of the outlet of the blower and one or more flat wings perpendicular to the rigid beam. The obstruction device can be formed to reduce the acoustic noise associated with the pressure pulsations from the blower.

The total airflow and total pressure can be held constant by adjusting the restrictor plate to reduce the airflow impedance at the blower inlet proportionally to the impedance from the obstruction device at the blower outlet. Again, the blower may be an evaporative blower for cooling and dehumidifying a xerographic cavity associated with a rendering device.

In other embodiments of such an apparatus, a conduit can be formed as a connection between the outlet of the blower and the xerographic cavity associated with the rendering device to allow airflow from the blower to enter the xerographic cavity. The obstruction device can then eliminate banding in a printed result of the rendering device caused by the pressure pulsations.

In still other embodiments of such an apparatus, an impingement angle can be located between the obstruction device and the outlet of the blower, wherein the impingement angle is adjustable to further reduce the acoustic noise associated with the pressure pulsations from the blower.

The blower can be connected to the outlet of the blower via a rigid beam connected to the outlet of the blower using attachment components such as, for example, screws, rivets, glue, and/or a weld.

A system for reducing acoustic noise is also disclosed comprising a blower associated with an environmental cooling unit, wherein the blower creates an airflow causing pressure pulsations resulting in acoustic noise, a restrictor plate connected to an inlet of the blower, wherein the restrictor plate creates an airflow impedance at the inlet of the blower, an obstruction device comprising a rigid beam fixedly connected to two edges of the outlet of the blower and at least one flat wing perpendicular to the rigid beam; and a conduit formed as a connection between the outlet of the blower and a xerographic cavity associated with a rendering device to allow airflow from the blower to enter the xerographic cavity, wherein the obstruction device reduces the acoustic noise in the xerographic cavity resulting from the pressure pulsations from the blower.

The system may require that the total airflow and total pressure at the inlet of the blower is kept equal to the total airflow and total pressure at the outlet of the blower by adjusting the restrictor plate to reduce the airflow impedance at the blower inlet proportionally to the impedance from the obstruction device at the blower outlet.

The blower may comprise an evaporative blower for cooling and dehumidifying the xerographic cavity associated with a rendering device. The obstruction device is formed at an impingement angle with respect to the blower outlet and is adjusted to reduce banding in the printed result caused by the acoustic noise in the rendering device. The system may further include a connection device for connecting the rigid beam of the obstruction device to the outlet of the blower. The connection device can be screws, rivets, glue, and/or a weld.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
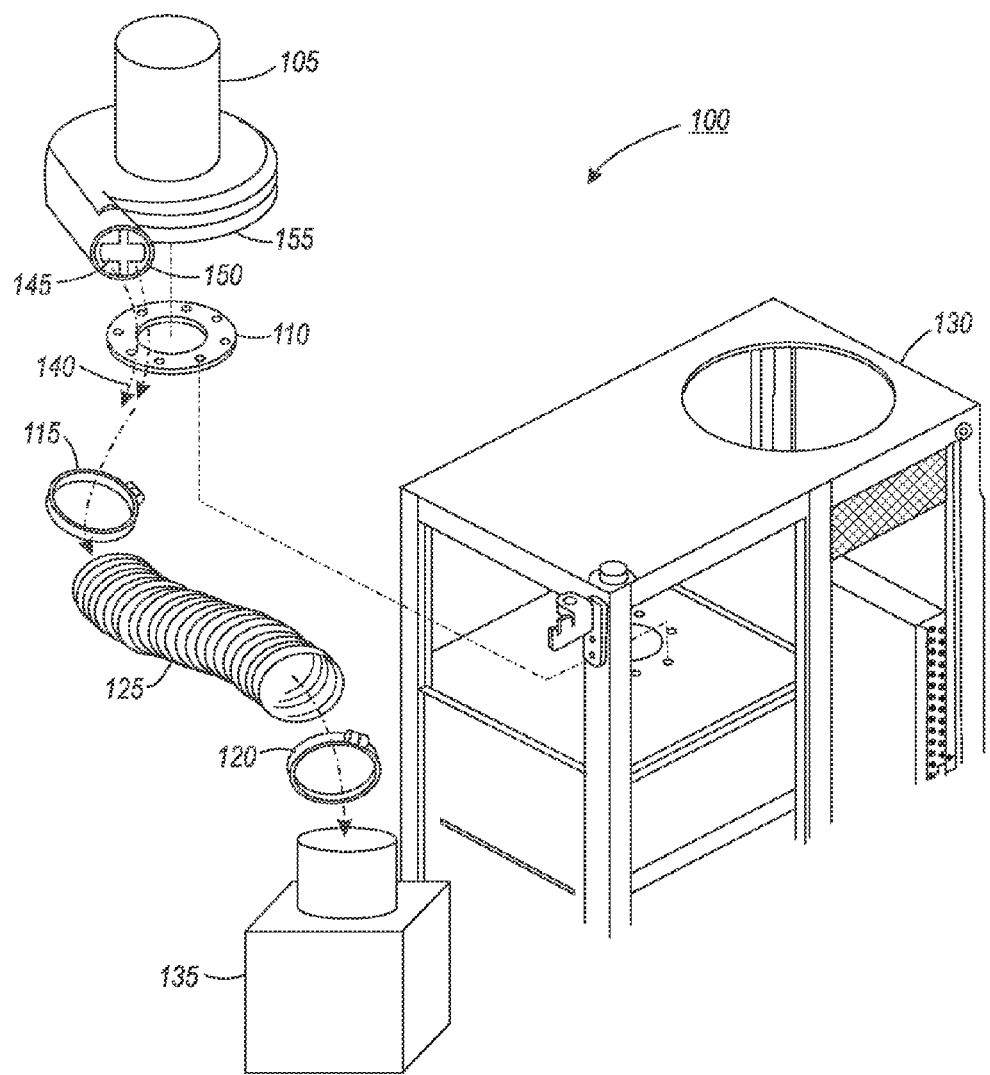
FIG. 1 depicts a printer system which is implemented in accordance with the disclosed embodiments.

A block diagram of an environmental unit 100 implemented, for example, in a rendering device such as a printer system in accordance with the methods and systems disclosed herein is shown in FIG. 1. Environmental unit 100 includes a housing 130 which may house any number of elements used in an electronic device such as a rendering device. Housing 130 may house an evaporative cooler for a printer. For example, housing 130 may comprise the main housing for a cooling system of a printing system or device such as, for example, Xerox's IGen4 digital printing press. Note that the IGen4 machine is one example of a business printer that provides advanced color management tools and high definition color images and is capable of printing a high volume of pages at a relatively low cost. It can be appreciated that a number of other types of printing devices and machines are similarly capable of implementation in accordance with the disclosed embodiments, and that reference to such a machine is merely for illustrative purposes.

The processing elements and other printing elements (not shown) in a rendering device can become very hot during use. Such heat can cause damage to the system hardware and result in poor performance of the rendering device. In addition, it is important to maintain a consistent humidity level in a rendering device to prevent damage to the hardware, and to provide a stable, optimal environment to the carrier and toner materials. Therefore, environmental unit 100 further includes a main evaporative blower 105. Main evaporative blower 105 is used to provide cooling airflow 140 through conduit 125 to a xerographic cavity 135. This airflow 140 is necessary to maintain controlled temperature and humidity in the xerographic cavity 135 and prevent damage to the system. Airflow 140 also provides a stable environment for the toner and carrier materials.

While it is necessary to provide this cooling to prevent overheating of the system, main evaporative blower 105 also creates vibrations and acoustic noise that must be controlled. For example, the main evaporative blower 105 may include a fan comprised of, for example, 6 radial blades rotating at 2920 revolutions per minute. This equates to a blade passing frequency of 292 Hz. The blade passing frequency can be generally determined for any similar environmental blower when the number of fan blades and revolution rate of the fan is known. Blower 105 therefore causes pressure pulsations at a frequency of 292 Hz to flow through conduit 125 into xerographic cavity 135.

The pulsations associated with airflow 140 in turn causes banding in the printed results of the rendering device associated with environmental unit 100. Banding is generally understood to be unwanted lines that appear across the printed result of a printing system. Banding can occur at a frequency equivalent to that of the pressure pulsations resulting from the main evaporative blower 105. For example, following the illustrative example above, pressure pulsations at a frequency of 292 Hz can cause vibrations in the xerographic cavity, which in turn causes banding at 292 Hz in the printed results.

A restrictor plate 110 is generally connected to the main evaporative blower inlet 155. It is important to control both total airflow 140 and total pressure throughout system 100. Restrictor plate 110 is used to control the airflow 140 by creating an impedance to thereby maintain constant airflow 140 and pressure at the blower inlet 155 and outlet 150. Therefore, in a preferred embodiment, restrictor plate 110 can be altered in shape and size, or removed, as necessary to maintain constant airflow 140 and pressure. Specifically, by reducing the size of restrictor plate 110, the impedance is also reduced, allowing higher air flow through inlet 155.

Clasping devices 115 and 120 are used to connect duct 125 to main evaporative blower 105 and xerographic cavity 135, respectively. In a preferred embodiment, an obstruction device 145 can be inserted at an outlet of the evaporative blower 105. Obstruction device 145 is configured to reduce or eliminate the pressure pulsations associated with airflow 140 that result from the fan blades of evaporative blower 105, and propagate through conduit 125 into xerographic cavity 135. However, obstruction device 145 will generally affect both total airflow 140 and pressure. Thus, in a preferred embodiment, restrictor plate 110 can be decreased in size, or removed, according to the relative change in airflow 140 resulting from the inclusion of obstruction device 145, so that total airflow 140 and pressure is maintained in the system 100.

Figure 2:
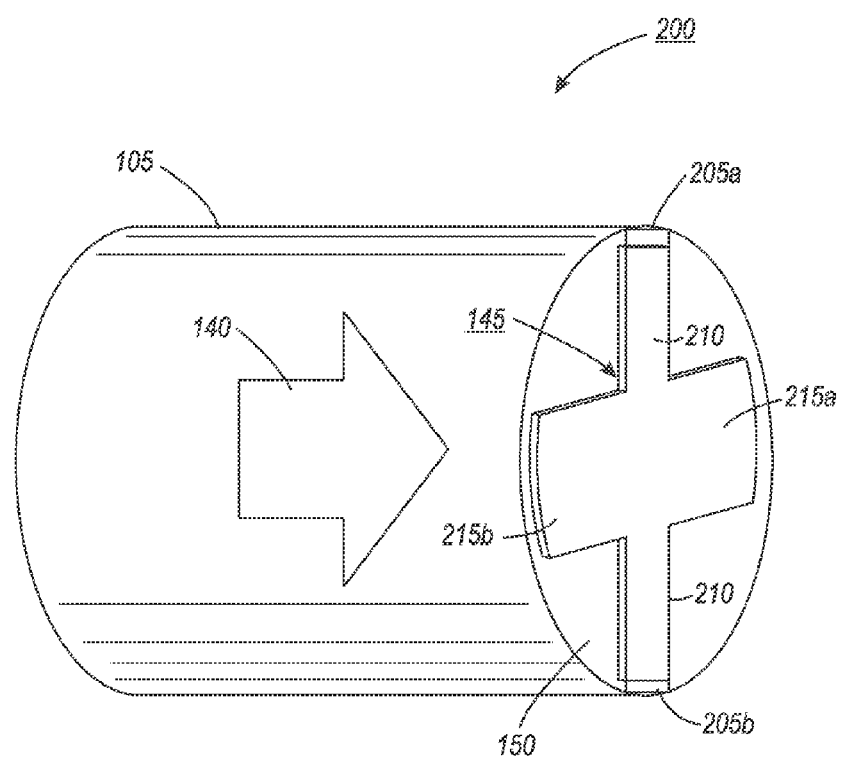
FIG. 2 depicts a graphical representation of an obstruction device implemented in accordance with the disclosed embodiments.

FIG. 2 depicts a graphical representation 200 of an obstruction device 145 in accordance with the disclosed embodiments in which aspects of the present invention may be implemented. It should be noted that in FIGS. 1 and 2, reference numerals may refer to identical or functionally similar elements throughout the separate views and are therefore referenced accordingly.

The outlet 150 of main evaporative blower 105 can be fitted with an obstruction device 145. Obstruction device 145 is comprised of a rigid beam 210 fastened on each end of the outlet 150 with a fastening material 205a and 205b, respectively. In a preferred embodiment, fastening material 205a and 205b may be material glue, a weld, screws, rivets, or other acceptable fastening device.

Obstruction device 145 further can include two flat wings 215a and 215b formed perpendicularly to rigid beam 210. For an observed banding frequency of 292 Hertz or a calculated pressure pulse frequency of 292 Hz, it has been experimentally shown that the maximum reduction of the pressure pulsation in the xerographic cavity 135 can be achieved by orienting rigid beam 210 vertically with wings 215a and 215b extending perpendicularly to the rigid beam 210. It should be appreciated that for different observed banding frequencies alternate orientations may be more effective.

FIG. 2 also illustrates a preferred shape of wings 215a and 215b. Wings 215a and 215b shown in FIG. 2 are flat on the front and back and relatively thin. In a preferred embodiment, wings 215a and 215b are made of sheet metal. However, it should be understood the shape and material used to make wings 215a and 215b may also be modified according to the observed banding frequency or calculated frequency of the pressure pulses for a given device.

An impingement angle can be defined as the angle between the direction of airflow 140 out of outlet 150 and wings 215a and 215b. Thus, in FIG. 2, the impingement angle is 90 degrees. Wings 215a and 215b can be rotated about the axis formed by rigid beam 210 to change the impingement angle and optimally reduce the pressure pulses. The exact angle of rotation can further be customized according to the observed banding frequency or calculated pressure pulses from the specific rendering device.

Figure 3:
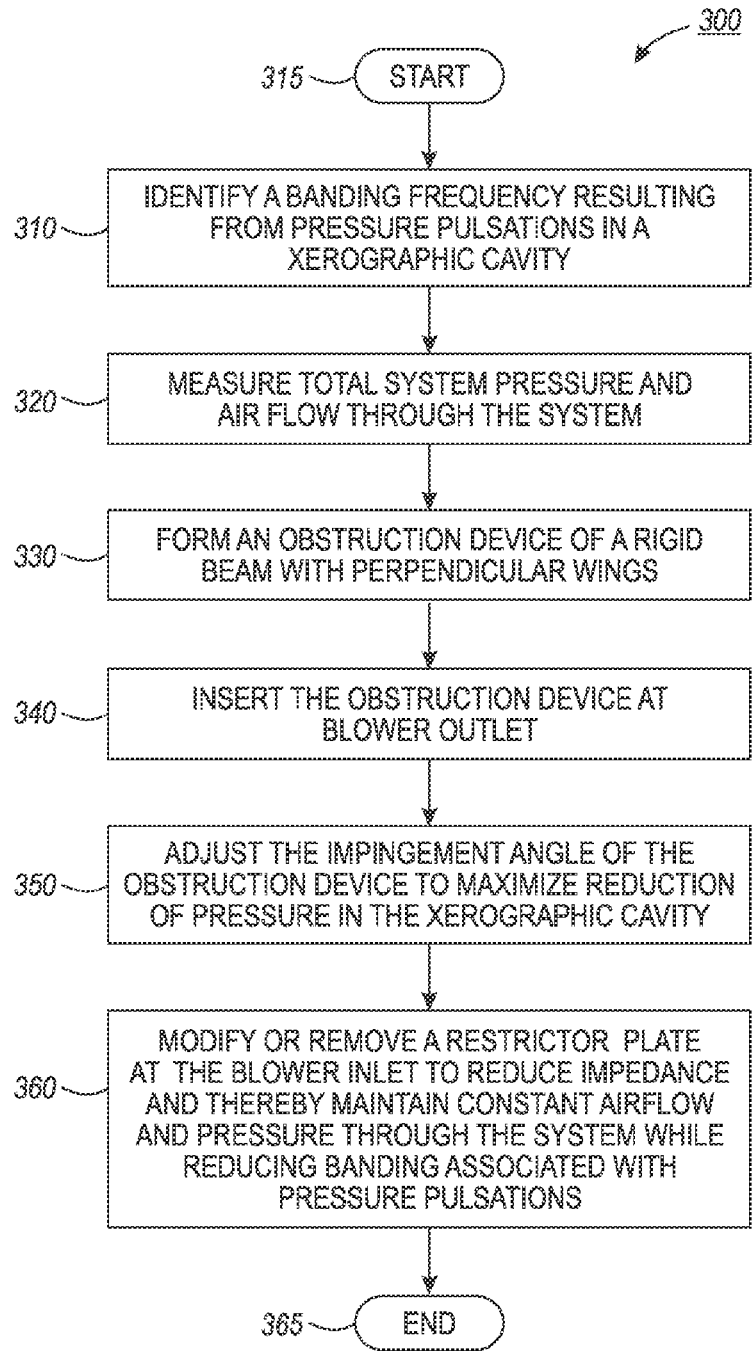
FIG. 3 depicts a high level flow chart illustrating logical operational steps in a method for reducing acoustic noise in accordance with the disclosed embodiments.

FIG. 3 illustrates a high level flow chart 300 of logical operational steps associated with a method for reducing acoustic noise emitted by a blower in accordance with the disclosed embodiments. The method begins, as indicated at block 315.

As illustrated at block 310, a banding frequency resulting from pressure pulsations created by the evaporative blower 105 can be determined. A banding frequency can be calculated by dividing the velocity of the paper moving through a rendering device by the distance between observed bands on a printed result. The banding is a result of vibration in the xerographic cavity 135 caused by pressure pulsations from the evaporative blower 105. Thus, as a check, the pressure pulsation frequency can also be calculated and compared to the banding frequency to ensure the banding is the result of vibrations resulting from the evaporative blower 105.

Next, as shown at block 320, a total system pressure and airflow 140 can be measured. It is important to maintain this pressure in the system to ensure proper cooling and humidity levels to prevent damage to the rendering device, and stability to the carrier and toner materials.

As described at block 330, an obstruction device 145 composed of a rigid beam 210 can be formed with wings 215a and 215b. As depicted at block 340, the obstruction device 145 can be connected via connections 205a and 205b to outlet 150. The obstruction device is preferably formed of sheet metal and arranged to reduce or eliminate banding associated with pressure pulsations in the xerographic cavity 135.

Next as depicted at block 350, the impingement angle of the obstruction device can be adjusted to further reduce or eliminate banding resulting from the pressure pulses in the xerographic cavity 135.

Filially, as indicated at block 360, the restrictor plate 110 can be modified or removed from inlet 155 to reduce impedance and thereby maintain a constant airflow 140 and pressure throughout system 100. Restrictor plate 110 can be circular in shape with a removed inner area, preferably also circular in shape. Thus, the restrictor plate 110 can include an empty space which can be defined by the radial distance from the empty center of the restrictor plate 110 to an inner radius of the restrictor plate. In a preferred embodiment, the impedance of the restrictor plate 110 can be reduced by increasing the radial distance to the inner radius, thereby increasing the area of the removed inner area. Depending on the size and shape of the obstruction device 145, it may also be necessary for the restrictor plate to be completely removed to maintain constant pressure and airflow 140 throughout the system 100.

Based on the foregoing, it can be appreciated that a number of embodiments, preferred and alternative, are disclosed herein. For example, in one embodiment, a method and/or system can be implemented for reducing acoustic noise by reducing a plurality of pressure pulsations propagated by the blower 105. An obstruction device can be inserted at an outlet of the blower. The impedance at the inlet of the blower can be utilized to maintain the total airflow and the total pressure propagated by the blower 105 to reduce the acoustic noise associated with the pressure pulsations propagated by the blower 105.

The obstruction device can be formed as a rigid beam fixedly connected to two edges of the outlet of the blower with at least one flat wing perpendicular to the rigid beam. The total airflow and the total pressure propagated by the blower without the obstruction device can be measured to identify a pressure pulsation frequency resulting from the pressure pulsations propagated from the blower. Then the obstruction device can be configured at the blower outlet to eliminate the pressure pulsations at the predetermined pressure pulsation frequency. A step can be implemented for adjusting the size of the impedance at the inlet of the blower to thereby maintain total airflow and total pressure after the obstruction device is inserted at the blower outlet.

Note that the blower 105 can be provided as an evaporative blower for cooling and dehumidifying, for example, a xerographic cavity associated with a rendering device. In this case, the step of forming the obstruction device can further include the steps of identifying a banding frequency in a printed result from the rendering device associated with the pressure pulsation frequency before the obstruction device is inserted, and shaping the obstruction device to eliminate the banding frequency in the printed result associated with the pressure pulsations.

Further, in other embodiments, a step can be provided for comparing the banding frequency with the pressure pulsation frequency to check that the acoustic noise is actually a result of the pressure pulsations.

In other embodiments, the obstruction device 145 may include an impingement angle between the obstruction device and the blower outlet that is adjusted to further reduce acoustic noise. The rigid beam of the obstruction device can be connected to the blower outlet with attachment components such as, for example, screws, rivets, glue, and/or a weld.

In yet another embodiment, an apparatus for reducing acoustic noise can be implemented. Such an apparatus can include, for example, the aforementioned blower 105, which creates airflow causing pressure pulsations. Such an apparatus can further include a restrictor plate connected to the inlet of the blower 105, wherein the restrictor plate creates an airflow impedance at the inlet of the blower, and an obstruction device comprising a rigid beam fixedly connected to two edges of the outlet of the blower 105 and one or more flat wings perpendicular to the rigid beam. The obstruction device can be formed to reduce the acoustic noise associated with the pressure pulsations from the blower 105.

The total airflow and total pressure can be held constant by adjusting the restrictor plate to reduce the airflow impedance at the blower inlet proportionally to the impedance from the obstruction device at the blower outlet. The blower 105 may be, for example, an evaporative blower for cooling and dehumidifying, for example, a xerographic cavity associated with a rendering device such as a printer, copy machine, multi-function machine, etc.

Furthering some embodiments, a conduit can be formed as a connection between the outlet of the blower 105 and the xerographic cavity associated with the rendering device to allow airflow from the blower to enter the xerographic cavity. The obstruction device can then eliminate banding in a printed result of the rendering device caused by the pressure pulsations.

In still another embodiment, an impingement angle maybe located between the obstruction device and the outlet of the blower 105. Such an impingement angle can be adjusted to further reduce the acoustic noise associated with the pressure pulsations from the blower 105.

In still another embodiment, a system for reducing acoustic noise can be implemented. Such a system can include, for example, the blower 105. The blower 105 can be associated with an environmental cooling unit, wherein the blower 105 creates an airflow causing pressure pulsations resulting in acoustic noise, a restrictor plate connected to an inlet of the blower, wherein the restrictor plate creates an airflow impedance at the inlet of the blower, an obstruction device comprising a rigid beam fixedly connected to two edges of the outlet of the blower and one or more flat wings perpendicular to the rigid beam; and a conduit formed as a connection between the outlet of the blower and a xerographic cavity associated with a rendering device to allow airflow from the blower to enter the xerographic cavity, wherein the obstruction device reduces the acoustic noise in the xerographic cavity resulting from the pressure pulsations from the blower.

The system requires that the total airflow and total pressure at the inlet of the blower is kept equal to the total airflow and total pressure at the outlet of the blower by adjusting the restrictor plate to reduce the airflow impedance at the blower inlet proportionally to the impedance from the obstruction device at the blower outlet.

The blower may comprise an evaporative blower for cooling and dehumidifying the xerographic cavity associated with a rendering device. The obstruction device is formed at an impingement angle with respect to the blower outlet and is adjusted to reduce banding in the printed result caused by the acoustic noise in the rendering device. The further includes a connection device for connecting the rigid beam of the obstruction device to the outlet of the blower. The connection device can be screws, rivets, glue, and/or a weld.

While the present invention has been particularly shown and described with reference to a preferred embodiment, it will be understood by those skilled in the art that various changes in form and detail may be made therein without departing from the spirit and scope of the invention. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An apparatus for reducing acoustic noise comprising:
a blower that creates an airflow that causes pressure pulsations, said blower having an inlet and an outlet;
a restrictor plate connected to said inlet of said blower, wherein said restrictor plate creates an airflow impedance at said inlet of said blower; and
an obstruction device comprising a rigid beam fixedly connected to two edges of said outlet of said blower and at least one flat wing perpendicular to said rigid beam, wherein said obstruction device reduces said acoustic noise associated with said pressure pulsations from said blower;
wherein said blower comprises an evaporative blower for cooling and dehumidifying a xerographic cavity associated with a rendering device.

2. The apparatus of claim 1 wherein a total airflow and a total pressure in said apparatus is held constant by adjusting said restrictor plate to reduce said airflow impedance at said blower inlet proportionally to an impedance from said obstruction device at said blower outlet.

3. The apparatus of claim 1 further comprising a conduit formed as a connection between said outlet of said blower and said xerographic cavity associated with said rendering device to allow airflow from said blower to enter said xerographic cavity.

4. The apparatus of claim 3 wherein said obstruction device eliminates a banding in a printed result of said rendering device caused by said pressure pulsations.

5. The apparatus of claim 1 further comprising an impingement angle of said obstruction device at said outlet of said blower wherein said impingement angle is adjusted to further reduce said acoustic noise associated with said pressure pulsations from said blower.

6. The apparatus of claim 1 further comprising a connection device for connecting said rigid beam to said outlet of said blower wherein said connection device comprises one of:
screws;
rivets;
glue; and
a weld.

7. A system for reducing acoustic noise comprising:
a blower associated with an environmental cooling unit, wherein said blower creates an airflow causing pressure pulsations resulting in acoustic noise;
a restrictor plate connected to an inlet of said blower, wherein said restrictor plate creates an airflow impedance at said inlet of said blower;
an obstruction device comprising a rigid beam fixedly connected to two edges of an outlet of said blower and at least one flat wing perpendicular to said rigid beam; and
a conduit formed as a connection between said outlet of said blower and a xerographic cavity associated with a rendering device to allow airflow from said blower to enter said xerographic cavity, wherein said obstruction device reduces said acoustic noise in said xerographic cavity resulting from said pressure pulsations from said blower.

8. The system of claim 7 wherein a total airflow and a total pressure at said inlet of said blower is made equal to a total airflow and total pressure at said outlet of said blower by adjusting said restrictor plate to reduce said airflow impedance at said blower inlet proportionally to an impedance from said obstruction device at said blower outlet.

9. The system of claim 7 wherein said blower comprises an evaporative blower for cooling and dehumidifying said xerographic cavity associated with said rendering device.

10. The system of claim 7 wherein said obstruction device is formed at an impingement angle with respect to said blower outlet wherein said impingement angle is adjusted to reduce a banding in a printed result caused by said acoustic noise in said rendering device.

11. The system of claim 7 further comprising a connection device connecting said rigid beam to said outlet of said blower wherein said connection device comprises one of:
- screws;
- rivets;
- glue; and
- a weld.

\* \* \* \* \*

UNITED STATES PATENT AND TRADEMARK OFFICE
CERTIFICATE OF CORRECTION

| | | |
|---|---|---|
| PATENT NO. | : 8,434,589 B1 | Page 1 of 1 |
| APPLICATION NO. | : 13/295860 | |
| DATED | : May 7, 2013 | |
| INVENTOR(S) | : Jorge Rodriguez et al. | |

It is certified that error appears in the above-identified patent and that said Letters Patent is hereby corrected as shown below:

Title Page:
Item (75) Inventors: delete "Drgham" and insert therefore --Dergham--.

Signed and Sealed this
Eleventh Day of June, 2013

Teresa Stanek Rea
*Acting Director of the United States Patent and Trademark Office*